May 2, 1933.   P. B. RENFREW ET AL   1,906,417
FILTERING APPARATUS
Filed July 20, 1928   3 Sheets-Sheet 1

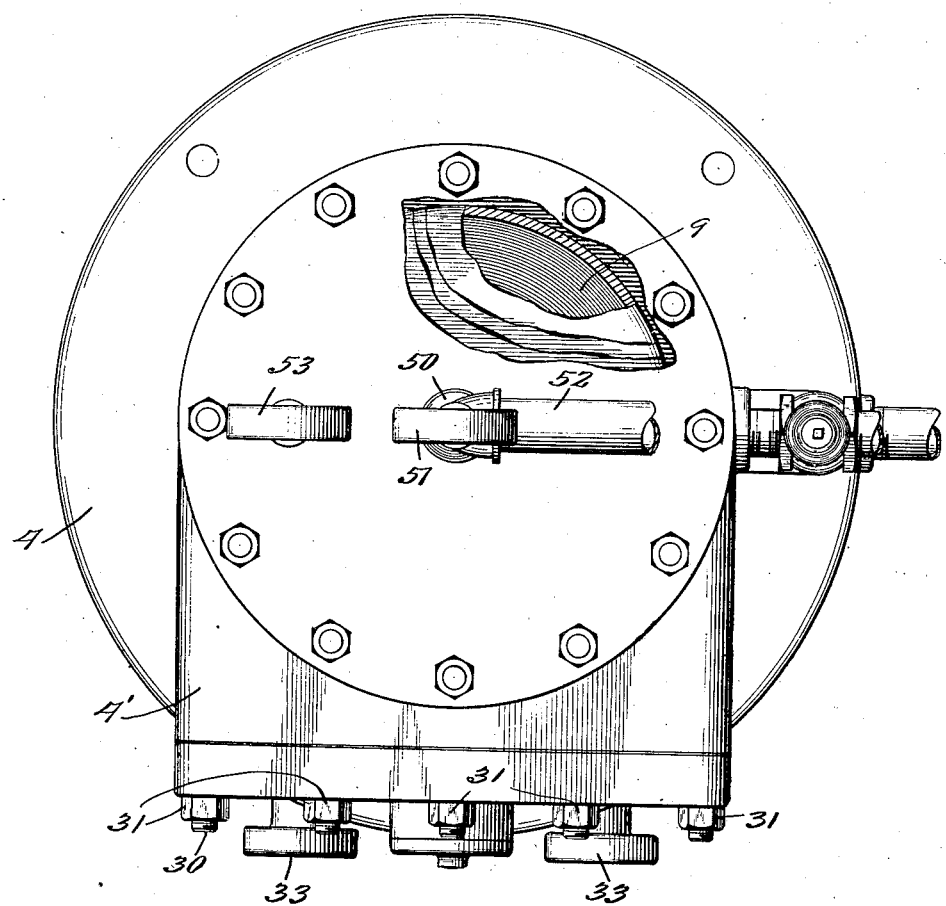

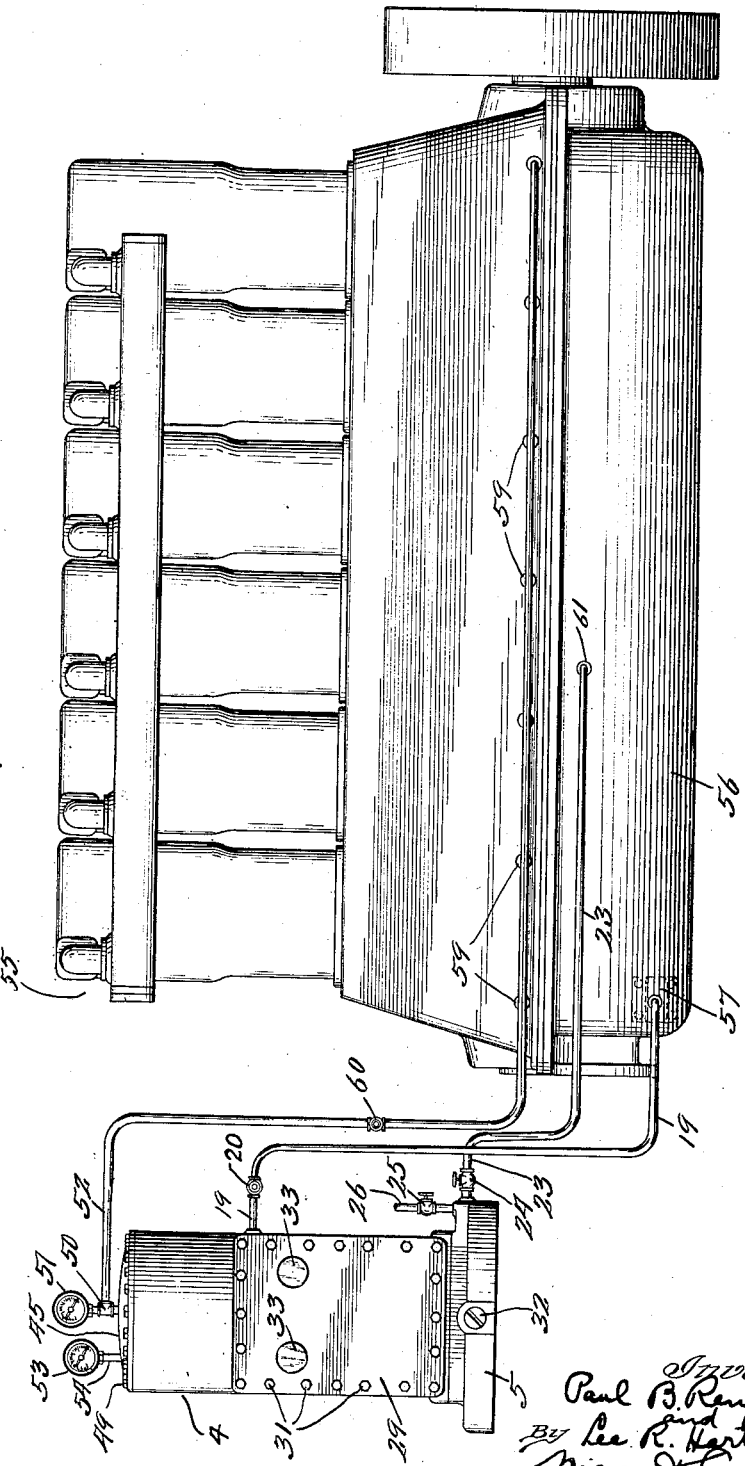

Patented May 2, 1933

1,906,417

UNITED STATES PATENT OFFICE

PAUL B. RENFREW AND LEE R. HARTLEY, OF FORT WAYNE, INDIANA, ASSIGNORS TO S. F. BOWSER & COMPANY, INC., OF FORT WAYNE, INDIANA, A CORPORATION OF INDIANA

FILTERING APPARATUS

Application filed July 20, 1928. Serial No. 294,213.

Our invention relates to filtering apparatus and although it is particularly adapted to the filtration of lubricating oils, such as used in Diesel engines or other types of internal combustion engines, it may have a general application.

The object of our invention is the provision of improved and efficient filtering apparatus having therein porous filtering units.

Another object of the invention is the provision of an improved and efficient automatic filtering apparatus for cleansing the lubricant used in an internal combustion engine or other machine without interfering with the constant supply of the lubricant to the machinery irrespective of the condition of the filtering apparatus.

Another object of the invention is the provision of filtering apparatus arranged in multiple, one permitting comparatively free flow of the lubricant back to the source of supply while filtering out the coarser particles of impurities, while the other greatly restricts the flow of the lubricant and filters finer particles of impurities from the lubricant before passing back to the source of supply.

Another object of the invention is the provision of double filtering apparatus in by-pass connections to a crank case of an internal combustion engine so controlled that free flow of the lubricant may be obtained while filtering out the coarser impurities, or by restricting such flow filtering may be obtained under pressure to eliminate the fine particles of impurities.

More particularly it is the object of the present invention to provide two types of filters in the same casing, one being adapted to filter the coarse particles of impurities and the other the fine particles of impurities, with connections to permit free flow through one filter or to restrict such flow and by means of a pump exert pressure on the other filter to filter out the fine particles of impurities.

Another object of the invention is the provision of improved and efficient apparatus for connecting the discharge sides of porous metal laminated filters with a source of fluid pressure to effect back-washing to loosen caked impurities from the entrance sides of the filter elements.

Other objects of the invention will appear hereinafter, the novel features and combinations being set forth in the appended claims.

Referring to the accompanying drawings—

Fig. 2 is a plan view of Fig. 1, with portions broken away, to show the construction of the lower set of filter units; and Fig. 3 is a view showing our improved automatic system for application to Diesel engines or any other type of internal combustion engines.

Figure 1:
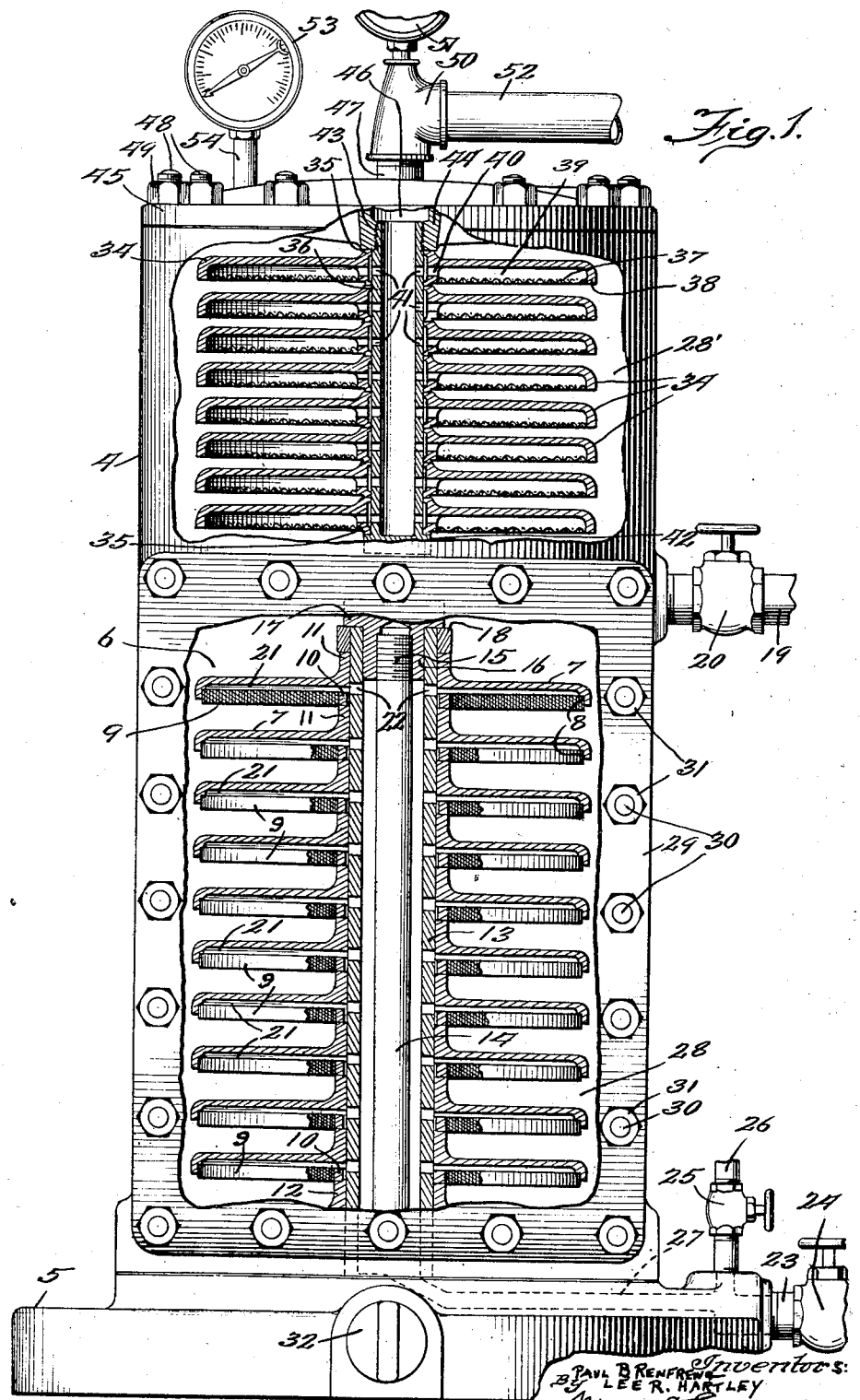
Fig. 1 represents our improved filtering apparatus, with portions of the casing broken away, to show in section, the construction of the two types of interior filtering units.

In the accompanying drawings, Fig. 1 shows a casing 4 mounted on a base or bed plate 5. In the lower portion of the casing 4 are mounted ten filter units 6, each comprising an inverted cup 7 in the periphery of which at 8 is soldered or otherwise secured a porous disc filter element 9, comprising a metal ribbon or tape so constructed and wound as to form a flat porous disc having a thickness equal to the width of the ribbon or tape.

The disc 9 is provided with a hub 10 which is adapted to rest on the next lower hub 11 of the cup 7. At the bottom of the casing is an annular support 12 on which the lowermost hub 10 may rest, as shown in Fig. 1. The upwardly projecting hubs 11 of the inverted cups 7 fit over the vertical pipe 13, the lower end of which is open and fits into the cylindrical bore in the support 12. A vertical rod 14 secured at its lower end to the bed plate 5 is mounted concentrically with the tube 13, but is of smaller diameter than the internal diameter of the tube 13 so as to provide sufficient space for flow of filtered oil from the upper or discharge surfaces of the disc filter elements 9. The upper end of the rod 14 is screw threaded at 15 to receive the nut 16 which is provided with an annular shoulder 17 which is adapted to rest on the ring collar 18, thereby clamping the hubs 10 and 11 of the filter units rigidly to the support 12 and the tube 13. When the filter units are thus assembled they will be held rigidly connected to the bottom of the casing 4.

The dirty or used liquid, such as used oil from the crank case of an internal combustion engine, may be permitted to flow through the pipe 19 into the casing 4 by opening the valve 20. When sufficient pressure is exerted on the incoming liquid it may be forced through the porous filter elements 9 in multiple and thence into the chambers 21 above the filter elements 9. The filtered lubricant may then pass through the ports 22 into the pipe 13 and thence through a passageway 27 in the bed plate 5 to the pipe 23. The flow of the filtered oil back to the crank case of the internal combustion engine may be controlled by the valve 24.

When the valve 24 is closed and the valve 25 is opened, compressed air may be introduced through the pipe 26 into the passageway which leads to the bottom of the pipe 13. Such compressed air will thus be forced through the ports 22 into the chambers 21 above the filter elements 9 to exert pressure downwardly and force from the entrance or lower sides of the filter elements such impurities as may have been caked thereon to such an extent as to interfere with the efficient operation of the multiple filtering apparatus in the lower portion of the casing 4. The passageway between the pipes 23 and 26 and the bottom of the pipe 13 is shown diagrammatically at 27 in the bed plate 5 at the lower portion of Fig. 1. It should be understood that the pipes 23 and 26 communicate through the passageway 27 with the bottom of the pipe 13 only and not with the bottom or interior of the casing 4 in the chamber 28 in which the multiple porous filter is mounted.

The lower portion of the casing 4 is so constructed as to provide for a large rectangular opening closed by a flat plate 29 securely bolted in closed position by the plurality of bolts 30 and nuts 31 distributed around the periphery of the plate 29, as shown in Figs. 1 and 2. The lateral extension 4' of the casing 4 may have fixed thereto the bolts 30. By loosening all of the nuts 31 and removing them the plate 21 may be entirely removed from the casing, thus exposing to view and rendering accessible all of the porous filter units so that they will be individually accessible for the purpose of mechanically cleaning the same. Whatever impurities collect on the tops of the inverted cups 7 may be scraped off and the impurities on the entrance sides of the porous disc filters may be scraped off and allowed to drop to the bottom of the chamber 28. After the filter units have been cleaned a rectangular gasket may be placed over the bolts and the rectangular face at the edge of the opening so that when the plate 29 is replaced and bolted firmly to the casing a liquid-tight fit will be secured so that considerable pressure, for example, one-hundred and fifty pounds per square inch, may be exerted on the bottoms of the filter units by the incoming lubricant pumped under pressure.

Such impurities as are removed by sedimentation or the impurities which drop from the filter units to the bottom of the chamber 28 may be removed by unscrewing the plug 32 from an opening in the bottom of the bed plate 5, which opening communicates with the bottom of the chamber 28. It should be understood, however, that the drain port which is normally closed by the screw plug 32 communicates only with the bottom of the chamber 28 and not with the interior of the pipe 13 or with the passageway 27.

In order that the condition of the oil or liquid in the chamber 28 may be observed at any time, sight windows 33, 33 may be provided in the plate 29, as shown in Fig. 3. By means of these sight windows the condition of the bottoms of one or two of the porous disc filters may also be observed so as to enable the attendant to decide when the flushing or backwashing operation should take place by closing the valve 24 and opening the valve 25 and permitting air pressure to be introduced through the pipe 26 and through the passageway 27 into the tube 13 and the chambers 21 above the porous discs 9. The attendant may also judge from the appearance of the oil at the sight windows 33 when the plug 32 should be removed to drain the accumulation of sludge or impurities at the bottom of the chamber 28.

In the upper portion of the casing 4 in the chamber 28' is another multiple filter, each unit of which comprises an inverted cup 34 having a hub 35 which fits over a tube 36. Each unit also has a filter screen 37 secured to the periphery 38 and to the hub 35 to form a chamber 39 which is in communication through the ports 40 and 41 with the interior of the pipe 36. The mesh of the screen 37 may be varied, as desired, but it is intended that it shall be sufficiently fine to filter out the coarser particles of impurities from the oil or other liquid being purified.

The tube or pipe 36 is closed at its lower end and provided with an annular seat 42 while the upper end of the pipe 36 is screw-threaded at 43 to the bottom center portion 44 of the cover plate 45. The upper end of the tube 36 is open and in communication with the port 46 to which the pipe 47 is connected. It will thus be seen that the lower-most filter unit has its hub 35 resting on the annular seat 42 and the remaining filter units are stacked one above another with their hubs in liquid-tight fitting relation with the pipe 36. By providing the lower end of the pipe 36 with a nut head the whole series of filters units may be clamped rigidly to the cover plate 45.

By means of the stud bolts 48 and the nuts 49 an annular gasket between the cover plate 45 and the top of the casing 4 may be clamped in position to form a liquid-tight fit. When the nuts 49 are loosened and removed, the cover plate 45 together with the entire stack of eight filter units in the chamber 28' may be removed from the top of the casing 4 for the purpose of cleaning the accumulation of impurities on the bottoms of the filter screens 37.

By means of a connection 50 an engine bearing gauge 51 may be connected to the pipe 47 and also to the pipe 52, as shown in Figs. 1 and 3. A filter gauge 53 may be connected by means of a pipe 54 to the cover plate 45 so as to be in communication with the chamber 28'.

In Fig. 3, we have shown more or less diagrammatically a Diesel engine 55 having a crank case 56 in the bottom of which is mounted a pump 57 for pumping the oil or lubricant from the bottom of the crank case 56 through the pipe 19 into the casing 4 when the valve 20 is open. It should be understood that the interior of the casing 4 is open from top to bottom and that the space in which the porous disc filter units are mounted is the chamber 28 and the space in which the screen filter units are mounted is the chamber 28'. The pipe 52 is connected at the various points 59 so as to direct filtered oil from the top of the casing 4 or from the chamber 28' to the bearings of the internal combustion engine when the valve 60 is open and the circulating system is adjusted for the flow of lubricant from the casing 4 to the pipe 52.

When the screen filter is in good operating condition so as to permit free flow of filtered oil to the engine bearings through the pipe 52, the pressure on the engine bearings may be regulated by the valve 60 so as to secure the desired reading of the pressure gauge 51. When the screen filters clog up with filtered material the pressure in the pipe 52 tends to decrease and when this is indicated by the pressure gauge 51, the valve 60 may be opened wider so as to increase the flow and the pressure to the bearings of the engine. The pressure exerted by the pump 57 on the oil in the casing 4 will be indicated by the filter gauge 53 since this gauge is in direct communication through the pipe 54 with the chambers 28, 28'. Whenever the engine operates, the pump 57 will be operated and the flow of the oil and the pressure at the engine bearings or at the connections 59 may be regulated by the valves 20 and 60, the valve 20 controlling the flow through the pipe 19 and the valve 60 controlling the flow through the pipe 52. The pressure within the casing 4 will be indicated by the pressure gauge 53 and the pressure in the pipe 52 and at the engine bearing connections 59 will be indicated by the pressure gauge 51. By means of the pressure gauge 53 the condition of the screen filter in the chamber 28' may be determined, because when the screens become clogged so as to interfere with their efficiency the pressure indication in the gauge 53 will become greater.

It should be noted that the porous disc filter units are arranged in a by-pass as to the circulating system for the lubrication of the engine bearings. The porous disc filters require considerable liquid pressure for their operation, for instance, one-hundred and fifty pounds per square inch. These porous disc filters are constructed of metal ribbon or tape having thereon spaced separators or cross-bars extending transversely of the tape or between the edges thereof so that when the metal ribbon or tape is wound into a disc, minute passageways will be formed between the entrance side and discharge side of the disc. The ribbon or tape is of thin metal, such as copper or other metal of sufficient strength to permit tight winding without undue distortion, compression or stretching of the metal itself. The tape or ribbon of thin metal is wound on the hub 10 into very compact substantially concentric layers to form a disc of laminations by means of one length of tape, which disc is soldered or otherwise secured at 8 to the annular seat at the periphery of the cup 7. The uniformly spaced cross-bars or cross-ribs or abutments form direct tubular passageways for the oil to filter through from the bottom side of the filter element to the chamber 21. The laminations are spaced by means of the separators or cross-ribs, and these in turn co-act with the smooth backs of the next ribbon to form parallel passageways to make the disc filter element porous over its entire area. By mounting the filter units in multiple, a large porous area for filtration is secured in a very compact space in the chamber 28.

While the thickness of the tape and the depth of the grooves or cross-channels thereon may be varied according to conditions and the liquid to be filtered, it has been found practicable in filtering lubricating oil used for the bearings of Diesel engines or other internal combustion engines to use copper ribbons three-eighths of an inch in width and thirty-six ten-thousandths of an inch in thickness with the cross-ribs thereon four ten-thousandths of an inch thick and spaced-apart to form grooves or channels four ten-thousandths of an inch in depth and one-eighth of an inch in width, leaving the cross-ribs approximately one-sixteenth of an inch in width. It should be understood that we do not wish to be limited to these particular dimensions and that they are specified merely to illustrate the character of the passageways between the flat faces of the filter elements between the edges of the laminations and that these passageways are not such as to permit flow of oil therethrough by gravity and that pump pressure is intended to be used to force the oil through such passageways.

By arranging the porous discs horizontally with the entrance sides on the bottom, the coarser particles which are separated from the oil in the chamber 28 may pass by gravity to the upper faces of the cups 7 and thence to the bottom of the casing 4 to be removed through the opening normally closed by the screw plug 32. The arrangement of the filter units with the entrance faces on the bottom also facilitates mechanical cleaning when the cover plate 29 is removed.

It should be understood, however, that the fine particles of carbon and other material separated from the oil by the porous disc filters need not be very frequently cleaned from the entrance sides of the porous filter elements, because the collection and caking of such carbon and other fine particles forms in itself a filtering layer and may be permitted to remain until the efficiency of the filtering apparatus is interfered with, as indicated by excessive pressure at the filter gauge 53. So long as the layer of carbon or other fine material remains in its porous condition and the heavier particles or coarser materials fall by gravity to the tops of the cups 7, the filter elements are not deemed to be clogged.

The desired pressure to operate the porous filter elements may be secured by regulation of the valves 24, 20 and 60. While the engine is operating the automatic circulating lubricating system for the bearings should not be interfered with; that is to say, the lubrication of the engine bearings should go on continuously, but the finer particles of material may be filtered out in a by-pass or a circulation which is in parallel or multiple with the engine bearing circulation. The pump 57 pumps the used lubricant from the bottom of the crank case 56 and introduces it into the casing 4 through the pipe 19. Here the oil may divide at a greatly reduced rate of flow, part going through the screen filters to take out the coarser impurities and then the lubricant flows through the connections 59 to the engine bearings and back into the crank case 56. At the same time when sufficient pressure is exerted in the chamber 28, part of the oil may be constantly purified by filtering out the finer particles of impurities and directing the filtered lubricant through the passageway 27 and the pipe 23 to the point 61 in the upper portion of the crank case reservoir 56. By closing the valve 25 and fully opening the valves 24 and 20, free flow of the oil will be permitted through the pipe 19 into the casing 4 and from the interior chambers 21 of the porous filter units through the pipe 23 back into the crank case, but it should be understood that the flow through the porous filter units is extremely restricted so as to secure the desired filtration of the very fine particles of impurities in the lubricant. In order to secure the desired pressure for operation of the porous filter elements, the valve 60 may be partially closed to restrict the flow through the pipe 52 to the engine bearing connections 59, thereby causing back pressure in the casing 4 to secure the requisite pressure to force the oil through the porous disc elements 9. This increased pressure in the casing 4 will be indicated by the filter gauge 53. Although the flow through the valve 60 is restricted, the circulation to the engine bearings will not be cut off, but will go on continuously. By observing the bearing gauge 51, as well as the filter gauge 53, and operating the valves 20 and 60, the desired regulation may be secured so that while the engine is operating its lubrication may go on continuously and at the same time sufficient pressure is produced in the chamber 28 to effect filtration of the finest particles of impurities while the screen filter is taking out the coarser particles of impurities.

It should be noted that, if desired, the lubrication of the internal combustion engine may go on to its maximum extent while the engine is in operation and driving a load, but when it is disconnected from the load and running idly, the valve 60 may be partially closed so as to greatly restrict the flow of the oil through the pipe 52 and thereby create sufficient pressure in the casing 4 to operate the porous disc filtering mechanism.

We prefer to mount the tank or casing 4 at such an elevation that the filtered oil may flow from the porous filter units by gravity to the crank case reservoir at 61.

Obviously those skilled in the art may make various changes in the details and arrangement of parts without departing from the spirit and scope of the invention as defined by the claims hereto appended and we wish therefore not to be restricted to the precise construction herein disclosed.

We do not claim herein the subject-matter of invention relating to the lubricating system, or method of lubricating an internal combustion engine, since the same forms the subject-matter of our copending divisional application, Serial Number 383,016, filed August 2, 1929, but having thus fully disclosed an embodiment of our invention, what we desire to secure by Letters Patent of the United States is:

1. In filtering apparatus, the combination with a tank to receive the liquid to be filtered, of two separate filters therein each adapted to be completely immersed in the liquid in said tank one for removing coarser impurities under low hydraulic pressure and the other to remove the finer impurities under high hydraulic pressure, separate outlets one for each of said filters, and means for conducting the liquid to be filtered into said tank for flow to and through said filters in parallel.

2. In filtering apparatus, the combination with a closed tank for receiving liquid under pressure, of two separate filters therein each adapted to be immersed in the liquid in said tank one for removing coarser impurities under low hydraulic pressure and the other for removing finer impurities under high hydraulic pressure, and means for restricting the flow from the filter removing the coarser impurities to increase the hydraulic pressure through the filter for removing the finer impurities.

3. In filtering apparatus, the combination with a hermetically sealed tank adapted to receive the liquid to be filtered under pressure, of a filter operable by liquid pressure in said tank to remove fine impurities, another filter in said tank operable by flow therethrough to remove coarse impurities, and means for regulating the flow from said last-named filter to effect sufficient pressure in said tank to operate the first-named filter.

4. In filtering apparatus, the combination with two separate filters one for removing coarser impurities and the other for removing finer impurities, of means for controlling the flow of liquid to be filtered to said filters, and means for controlling the flow of the filtered liquid from the filter taking out the coarser impurities to effect sufficient pressure to operate the other filter for taking out the finer impurities.

5. In filtering apparatus, the combination with a filter for removing coarse impurities, of a separate filter for removing fine impurities, means for controlling the flow to said filters, and means for restricting the flow from the first-named filter to effect sufficient pressure to operate the second-named filter.

6. In filtering apparatus, the combination with a liquid-receiving tank, of a multiple filter comprising spaced-apart horizontal units stacked in vertical series with the entrance side of each unit on the bottom free and unobstructed to render the same accessible for cleaning purposes while the multiple filter remains intact, and means within the vertical series of stacked units for receiving the filtered liquid.

7. In filtering apparatus, the combination with a plurality of filter units each comprising a holding cup having a hub with filtering means supported entirely by said hub and the periphery of said cup, of means for supporting such a plurality of filter units with their hubs in engagement with one another and with their peripheral portions spaced apart to provide free and unobstructed spaces between the filtering means of one filter unit and the holding cup of the next adjacent filter unit, and means for directing the flow of the filtered liquid from the plurality of filter units.

8. In filtering apparatus, the combination with a tubular support closed at one end and open at the other end, of a plurality of filter units mounted on said tubular support and each having a chamber within the same in communication through an opening in said tubular support with the interior of the latter, said filter units having hubs for spacing apart the filter units to render the spaces between the same surrounding said tubular support free and unobstructed and readily accessible for cleaning purposes while said filter units remain in place on said tubular support, and means for securing the filter elements to said tubular support while such spaces between the filter units remain free and unobstructed.

9. In filtering apparatus, the combination with a plurality of filter units each comprising a shallow cup having a hub and a porous laminated grooved filter ribbon very tightly and compactly wound to form a rigid filter element mounted in the cup between the hub and the periphery thereof with a receiving chamber between the filter element and the bottom of the cup, of a common discharge pipe perforated for communication with the chambers in said filter units, and means for rigidly connecting said filter units to said pipe for operation in multiple while the hubs of said cups maintain the spaces between the entry sides of said filter elements and the back sides of said cups free and unobstructed to render the same freely accessible for cleaning purposes.

10. In filtering apparatus, the combination with a closed tank, of a multiple unit filter comprising a plurality of impermeable cups and filter elements permanently supported by said cups to afford hollow receiving compartments between the filter elements and the bottoms of the cups, and means for supporting the cups and filter elements with the spaces between each filter element and the back of the next adjacent cup free and unobstructed to facilitate cleaning of the filter elements while the multiple filter units remain in said tank.

11. In filtering apparatus, the combination of a multiple filter comprising a plurality of filter units each rigid throughout and each having its entry surface from its lower side, and means for stacking said filter units in rigid relation with such lower entry surfaces spaced above the tops of the next adjacent units to afford free and unobstructed spaces accessible for cleaning of such entry surfaces.

12. In filtering aparatus, the combination with a plurality of filter units each comprising a shallow cup and a porous laminated grooved filter ribbon of impermeable material very tightly and compactly wound to form a rigid filter element permanently mounted in said cup and rigid therewith, of means for mounting said filter units with the filter elements on the lower sides of said cups and with the spaces between such lower sides and the upper sides of the next adjacent cups free and unobstructed to render the lower sides of the filter elements accessible for cleaning purposes, and means for holding the rigid filter units rigidly connected together.

13. In a filtering apparatus the combination with a fine filtering means and a coarse filtering means arranged in parallel therewith, each filtering means being arranged to receive different portions of liquid from a common source of liquid supply, of common means for supplying liquid to be filtered from said source to both of said filtering means so that separate portions of said liquid can flow to either of said filtering means but not through both of said filtering means, means for directing separate portions of said liquid through said two filtering means, discharge outlets leading from each of said filtering means, and means included in said apparatus for causing at least part of the liquid delivered to said apparatus by said common supplying means to pass through said fine filter.

In testimony whereof we have signed our names to this specification on this 12 day of June, A. D. 1928.

PAUL B. RENFREW.
LEE R. HARTLEY.